United States Patent [19]

Kamada et al.

[11] 4,035,333

[45] July 12, 1977

[54] FLAME-RESISTANT RESIN COMPOSITION

[75] Inventors: Kazumasa Kamada; Ryoji Handa; Masafumi Hongo, all of Ohtake, Japan

[73] Assignee: Mitsubishi Rayon Co., Ltd., Tokyo, Japan

[21] Appl. No.: 621,393

[22] Filed: Oct. 10, 1975

[30] Foreign Application Priority Data

Oct. 14, 1974 Japan .............................. 49-117851
Jan. 6, 1975 Japan ................................ 50-4348

[51] Int. Cl.² .................... C08K 3/24; C08K 3/40
[52] U.S. Cl. .................... 260/40 R; 260/45.75 B; 260/835; 260/860; 260/857 PE; 260/873
[58] Field of Search ............. 260/45.75 B, DIG. 24, 260/40 R

[56] References Cited

U.S. PATENT DOCUMENTS

| | | | |
|---|---|---|---|
| 3,560,441 | 2/1971 | Schwarz et al. | 260/45.75 B |
| 3,624,024 | 10/1975 | Caldwell et al. | 260/45.75 B |
| 3,673,139 | 6/1972 | Hrach | 260/873 X |
| 3,742,087 | 6/1973 | Nield | 260/873 X |
| 3,855,277 | 12/1974 | Fox | 260/DIG. 24 |
| 3,859,246 | 1/1975 | Jackson et al. | 260/DIG. 24 |
| 3,976,722 | 8/1976 | Carlson | 260/45.75 B X |

*Primary Examiner*—Sandra M. Person
*Attorney, Agent, or Firm*—Oblon, Fisher, Spivak, McClelland & Maier

[57] ABSTRACT

This invention relates to a flame-resistant resin composition improved in arc resistance, comprising polytetramethylene terephthalate, a flame-retardant halogen compound, and sodium antimonate or a sodium antimonate-antimony trioxide mixture containing 40% by weight or more of sodium antimonate, and optionally talc, the amount of the halogen compound being 3 to 50 parts by weight per 100 parts by weight of polytetramethylene terephthalate, the weight ratio of the halogen compound to the total antimony compound being 0.25 to 6, and the amount of talc being 0 to 60% by weight based on the weight of the composition. This composition may also contain a reinforcing filler.

9 Claims, No Drawings

FLAME-RESISTANT RESIN COMPOSITION

This invention relates to a flame-resistant resin composition improved in arc resistance, comprising polytetramethylene terephthalate.

As is expectable from the polymer structure, polytetramethylene terephthalate and a reinforced product thereof are free from a problem of hygroscopicity as compared with a nylon resin and a reinforced product thereof; they are also superior in rate of crystallization to polyethylene terephthalate and a reinforced product thereof, so that crystallization is sufficiently accelerated at a mold temperature below 100° C. in injection molding, even if a nucleating agent is absent, and there is substantially no problem with respect to moldability or processability. In short, as compared with a nylon or polyethylene terephthalate and a reinforced product thereof, polytetramethylene terephthalate and a reinforced product thereof are well-balanced in all resin characteristics including mechanical properties, thermal properties, moldability, and hygroscopicity, and accordingly, they are expected as new useful resin in industry, particularly as a material for use in elements for electric appliances.

In recent years, however, as the flammability of electric materials has become a serious problem, it is necessary that a material for use in electric elements is flame-resistant. Polytetramethylene terephthalate resin, like other resins, also has a problem with respect to flammability and improvement of its flammability is of considerable significance, all the more because of its otherwise excellent characteristics.

For imparting flame resistance to a polytetremethylene terephthalate resin, it is predictable that the addition of a halogen compound jointly with antimony trioxide is effective and, in fact, there have been proposed as flame-retardants such halogen compounds as tetrabromophthalic anhydride, hexabromobenzene, halogenated bisphenol-A, halogenated diphenyl, and halogenated diphenyl ether. The polytetramethylene terephthalate resin and reinforced products thereof incorporated with a combination of a halogen compound and antimony trioxide, however, are inferior in electric characteristics, particularly in arc resistance, regardless of the type of halogen compound used, and a polytetramethylene terephthalate composition excellent in arc resistance as well as in flame resistance has never been obtained.

An object of this invention is to provide a polytetramethylene terephthalate composition having flame-resistance without reducing arc-resistance.

The present inventors conducted extensive research on a means of imparting flame resistance to polytetramethylene terephthalate without deteriorating the excellent electric properties, particularly arc resistance, inherent in the above resin. As a result, it has been found that the arc resistance can be improved by substituting sodium antimonate for a part of the whole of the antimony trioxide used jointly with a halogen compound as flame retardant. When a halogen compound is used jointly with antimony trioxide, the flame-retarding effect is generally increased markedly by the synergistic effect of the two, while the arc resistance is rather synergistically decreased, resulting in a serious defect of the material. To the contrary, when a halogen compound is used in combination with sodium antimonate, a flame-retarding effect comparable to that in the above case is obtained, while the arc resistance is not decreased so much as in the above case. This is an entirely unexpected fact.

A further object of this invention is to provide a flame-resistant resin composition highly improved in arc resistance, which is suitable as an electric material for use in the field where particularly high levels of electric characteristics and flame-resistance are required. Uses which require such a high level of electric characteristics include, for example, uses in materials for supporting charge elements and for fuse and switches. These uses require, in addition to excellent electric characteristics and flame-resistance, high strength, high heat resistance, and high dimensional stability. There haa been available no composition meeting the above requirements and having desirable moldability.

In order to solve the above further problem, the present inventors conducted further research for the purpose of imparting higher arc resistance to polytetramethylene terephthalate together with a high flame resistance without deteriorating the excellent characteristics inherent in the above resin, with paying due consideration to moldability or processability. As a result, it has been found that the arc resistance is synergistically improved by employing sodium antimonate along with talc. This is also a surprising fact.

If talc alone is used to improve the arc resistance, it must be added in large amounts, whereby another difficulty such as a decrease in moldability is caused, and in some cases the improvement in arc resistance is still insufficient for some uses. By using sodium antimonate and talc in combination, it is possible to improve the arc resistance to such a great extent as is unexpectable from the effect of each of talc and sodium antimonate on arc resistance, and it is also possible to avoid deterioration in moldbility or processability including flow property because of reduction in amount of talc resulting from the co-use of the two.

According to this invention, there is provided a flame-resistant resin composition having an improved arc resistance and being adaptable to a broad range of uses, which comprises polytetramethylene terephthalate, a flame-retardant halogen compound and sodium antimonate or a sodium antimonate-antimony trioxide mixture containing 40% by weight or more of sodium antimonate, and optionally talc, the amount of the halogen compound being 3 to 50 parts by weight per 100 parts by weight of polytetramethylene terephthalate, the weight ratio of the halogen compound to the total antimony compound being 0.25 to 6, and the amount of the talc being 0 to 60% by weight based on the weight of the total composition; and also provided a reinforced resin composition comprising said resin composition and 40% by weight or less of a reinforcing filler based on the weight of the reinforced resin composition.

The halogen compounds used in the present invention include various halogen-substituted aromatic compounds, halogen-substituted aliphatic compounds, and polymers of these compounds, for example, hexabromobenzene, hexachlorobenzene, tetrabromobisphenol-A and derivatives thereof, tetrabromophthalic anhydride, decabromodiphenyl ether, trisdibromophenyl phosphate, trisdichlorophenyl phosphate, tris-2,3-dibromopropyl phosphate, cycloaliphatic compounds such as $C_{14}H_4Cl_{12}O$, $C_{17}H_8Cl_{12}$, and $C_{18}H_{12}Cl_{12}$; polymers such as brominated polyester resins, brominated epoxy resins, and brominated polycarbonate resins. Any of these compounds may be used as far as they are stable in the molding temperature range of polytetramethylene terephthalate resin. The amount of these halogen compounds used is 3 to 50 parts, preferably 5 to 30 parts, by weight per 100 parts by weight of polytetramethylene terephthalate, depending upon the degree of flame resistance which is required. If the amount is below 3 parts by weight, satisfactory flame resistance is not imparted, while if it exceeds 50 parts by weight, the characteristics of the resin are deteriorated.

The sodium antimonate used in the present composition is represented by the formula $NaSbO_3 \cdot xH_2O$. It is necessary to add sodium antimonate or a mixture of sodium antimonate and antimony trioxide in such an amount that the weight ratio of the halogen compound to sodium antimonate or to the mixture of sodium antimonate and antimony trioxide is from 0.25 to 6, preferably from 0.5 to 5. If the ratio is less than 0.25, the excessive sodium antimonate or sodium antimonate-antimony trioxide mixture tends to deteriorate the mechanical properties of the composition, while if the ratio exceeds 6, the contribution of the antimony compound to the synergistic effect becomes insignificant. When a mixture of sodium antimonate and antimony trioxide is used, the sodium antimonate content of the mixture should be 40% by weight or higher. If the content is below 40% by weight, the improving effect of sodium antimonate on the arc resistance of the composition becomes insufficient.

Even in the absence of talc, sodium antimonate has a favorable effect on both arc resistance and flame resistance of the composition, rendering the composition useful in the case where toughness of the composition is strongly required.

When talc is used in the present composition, the amount of talc added is preferably 60% by weight or less of the total composition comprising polytetramethylene terephthalate, the halogen compound, sodium antimonate or the mixture of sodium antimonate and antimony trioxide, and talc. In order that the synergistic effect of sodium antimonate and talc be fully exhibited, it is necessary to add 2% by weight or more of talc. The upper limit of talc content, which is 60% by weight, was set from the viewpoint of not arc resistance but flowability in molding and mechanical properties of the composition. A high arc resistance is attainable with a smaller amount of talc, owing to the synergistic effect of talc and sodium antimonate, and hence, the addition of 3 to 40% by weight of talc is sufficient to meet the usual requirements for performance characteristics of the composition.

The present composition can be incorporated with various reinforcing fillers which may be in a variety of forms such as fibrous form, for example, glass fiber and whisker; spherical form; and the like. For instance, in the case of glass fibers, the type of fibers and the method of mixing are not critical and any of the roving-type and the dispersive short-fiber type may be used, although the latter type is preferred from the standpoint of productivity. Short fibers, 0.4 to 6 mm in length, are particularly preferred in view of workability in mixing, abrasion of molding machines, and cutting of fibers during molding. In the final molded articles, a length of fiber of about 0.1 to about 2 mm is sufficient.

Commercially available glass fibers subjected to various treatments can be used as such.

The amount of a reinforcing filler such as glass fiber to be added is 40% by weight or less based on the total composition comprising the reinforcing filler. If the amount exceeds 40% by weight, the moldability in terms of flow behavior is decreased, while if it is below 3% by weight, the reinforcing effect becomes insufficient.

The method of addition of the reinforcing filler is not critical and any of the methods known to the art may be employed. It is, however, preferred in view of operational convenience that the reinforcing filler is added together with the halogen compound, and sodium antimonate or a mixture thereof with antimony trioxide and optionally talc to polytetramethylene terephthalate chips.

Polytetramethylene terephthalate is synthesized, for example, from 1,4-butanediol and dimethyl terephthalate. There may be used, if necessary, co-condensation polymers of tetramethylene terephthalate with small amounts of diols such as ethylene glycol, 1,3-propanediol or the like and carboxylic acids such as isophthalic acid or the like; and a blend of polytetramethylene terephthalate and 40% by weight or less of other polymers such as, for example, polycarbonate, polystyrene, polymethyl methacrylate, polyethylene terephthalate, polyethylene, polypropylene, ABS resins, nylon resins, and the like.

The intrinsic viscosity, $(\eta)$, as measured in an equal weight mixture solvent of tetrachloroethane and phenol at 25° C., of polytetramethylene terephthalate to be used ranges generally from 0.4 to 3.0, though an intrinsic viscosity of 0.6 to 2.5 is particularly preferable in view of the mechanical properties of the final molded article and the flowability in injection molding of the composition.

The present composition, if necessary, may have incorporated thereinto additives other than the reinforcing fillers, such as stabilizers against light or heat, dyestuffs, pigments, etc.

The invention is illustrated below in detail with reference to Examples which, however, are merely illustrative and not limitative.

EXAMPLES 1 TO 5

In a V-shaped blender, 5.5 kg of thoroughly dried polytetramethylene terephthalate (hereinafter referred to as PTMT) having $(\eta)$ of 0.93, as measured in an equal weight mixture of tetrachloroethane and phenol, 3.0 kg of a commercially available chopped strand type glass fiber of 3 mm in fiber length and about 10 $\mu$ in diameter, 1.0 kg (18 parts by weight per 100 parts by weight of PTMT) of each of the flame retardants shown in Table 1, and 0.5 kg (9 parts by weight per 100 parts by weight of PTMT) of sodium antimonate ($NaSbO_3 \cdot \frac{1}{2}H_2O$) were mixed for 5 minutes. The resulting mixture was shaped into pellets by means of a 40-mm $\phi$ vented extruder at 200° to 250° C. to obtain a flame-resistant resin composition falling in the scope of the present invention. Molded test specimens were obtained from the pellets by means of a 36 mm $\phi$ screw-type injection molding machine of an about 5-ounce capacity at a cylinder temperature of 250° C. and at a mold temperature of 100° C., the molding cycle having been 60 seconds. The test specimen was evaluated for flammability and arc resistance. The results obtained were as shown in Table 1.

In Comparative Examples 1 to 5 shown in Table 1, the same procedure as mentioned above was repeated except that the sodium antimonate was replaced by antimony trioxide which is an ordinary flame retardant. In Comparative Example 6, no flame retardant was used but 30% by weight of glass fibers was added.

As is apparent from the test results shown in Table 1, the composition of this invention is markedly improved in arc resistance and yet has a satisfactory self-extinguishing property.

The L.O.I. (limiting oxygen index) shown in Table 1 was measured in accordance with the method of ASTM D 2863. A L.O.I. higher than 25 indicates that the test specimen is self-extinguishing. The arc resistance was tested in accordance with the method of ASTM D 495.

ate, and shows no deterioration in other resin characteristics.

EXAMPLES 6 TO 8

In a V-shaped blender, 10 kg of thoroughly dried PTMT having $(\eta)$ of 0.99, 1.6 kg (16 parts by weight per 100 parts by weight of PTMT) of each of the flame retardants shown in Table 3, and 1 kg (10 parts by weight per 100 parts by weight of PTMT) of sodium antimonate ($NaSbO_3 \cdot \frac{1}{4}H_2O$) were mixed for about 5 minutes. By use of a 40-mm $\phi$ vented extruder, the mixture was shaped into pellets at a cylinder temperature of 200° to 240° C. to obtain a flame-resistant composition falling in the scope of this invention.

Table 1

|  | Flame retardant | | Flammability, L.O.I. ASTM D 2863 | Arc resistance, sec. ASTM D 495 |
|---|---|---|---|---|
|  | Flame retardant | Auxiliary agent | | |
| Example 1 | Hexabromobenzene | $NaSbO_3 \cdot \frac{1}{4}H_2O$ | 31.5 | 80 |
| Example 2 | Tetrabromobisphenol-A | " | 28.5 | 75 |
| Example 3 | Trisdibromophenyl phosphate | " | 28.0 | 62 |
| Example 4 | $C_{18}H_{12}Cl_{12}$ (Cycloaliphatic compound) | " | 27.5 | 67 |
| Example 5 | Brominated epoxy resin, 46% bromine content | " | 29.0 | 79 |
| Comparative Example 1 | Hexabromobenzene | $Sb_2O_3$ | 35.0 | 32 |
| Example 2 | Tetrabromobisphenol-A | " | 32.0 | 25 |
| Example 3 | Trisdibromophenyl phosphate | " | 30.5 | 16 |
| Example 4 | $C_{18}H_{12}Cl_{12}$ (Cycloaliphatic compound) | " | 30.0 | 14 |
| Comparative Example 5 | Brominated epoxy resin, 46% bromine content | $Sb_2O_3$ | 31.5 | 30 |
| Example 6 | — | — | 21.0 | 120 |

In Table 2, there are shown the results of tests for mechanical and thermal properties conducted on the specimens obtained in Examples 1 to 5 and Comparative Examples 1 to 6.

From Table 2, it is seen that the present composition showed no deterioration in mechanical and thermal properties.

The pellets were injection-molded in the same manner as in Example 1 to prepare test specimens. Flammability and arc resistance of the composition were tested on said test specimens. The results obtained were as shown in Table 3.

In Comparative Examples 7 to 9 shown in Table 3, the same procedure as mentioned above was repeated, Table 2

|  | Tensile strength, kg/cm² ASTM D 638 | Flexural strength, kg/cm² ASTM D 790 | Izod impact strength, notched, kg·cm/cm ASTM D 256 | Deflection temperature, °C. ASTM D 648 |
|---|---|---|---|---|
| Example 1 | 1120 | 1700 | 6.6 | 205 |
| Example 2 | 1100 | 1650 | 5.0 | 197 |
| Example 3 | 1100 | 1750 | 5.9 | 200 |
| Example 4 | 1080 | 1660 | 6.7 | 205 |
| Example 5 | 1150 | 1880 | 7.2 | 201 |
| Comparative Example 1 | 1140 | 1720 | 6.5 | 205 |
| Comparative Example 2 | 1130 | 1650 | 4.7 | 196 |
| Comparative Example 3 | 1140 | 1730 | 5.8 | 201 |
| Comparative Example 4 | 1110 | 1700 | 6.5 | 205 |
| Comparative Example 5 | 1170 | 1850 | 6.1 | 202 |
| Comparative Example 6 | 1230 | 1910 | 7.8 | 205 |

Thus, the present composition is flame-resistant, has an improved arc resistance compared with a flame-resistant composition containing no sodium antimonate, and shows no deterioration in other resin characteristics.

except that the sodium antimonate was replaced by antimony trioxide which is an ordinary flame-retardant auxiliary agent. In Comparative Example 10, plant PTMT was tested.

Table 3

|  | Flame retardant | | Flammability, L.O.I. ASTM D 2863 | Arc resistance, sec. ASTM D 495 |
|---|---|---|---|---|
|  | Flame retardant | Auxiliary agent | | |
| Example 6 | Hexabromobenzene | $NaSbO_3 \cdot \frac{1}{4}H_2O$ | 29.5 | 70 |
| Example 7 | $C_{18}H_{12}Cl_{12}$ (Cycloaliphatic compound) | " | 27.5 | 60 |
| Example 8 | Brominated epoxy resin, 46% bromine content | " | 28.5 | 63 |
| Comparative Example 7 | Hexabromobenzene | $Sb_2O_3$ | 32.5 | 30 |

Table 3-continued

| | Flame retardant | | Flammability, L.O.I. ASTM D 2863 | Arc resistance, sec. ASTM D 495 |
|---|---|---|---|---|
| | Flame retardant | Auxiliary agent | | |
| Example 8 | $C_{1n}H_{12}Cl_{12}$ (Cycloaliphatic compound) | '' | 29.0 | 15 |
| Example 9 | Brominated epoxy resin, 46% bromine content | '' | 30.5 | 25 |
| Example 10 | — | — | 21.5 | 120 (melted) |

EXAMPLES 9 TO 13

According to the formulations given in Table 4, thoroughly dried PTMT having $(\eta)$ of 0.93, a flame retardant or a mixture of two flame retardants, and sodium antimonate or a mixture of sodium antimonate and antimony trioxide were mixed together with 3 kg of a commercially available glass fiber in a V-shaped blender for about 5 minutes. In the same manner as in Example 1, the resulting mixture was extruded and shaped into pellets to obtain a flame-resistant resin composition falling in the scope of this invention. The pellets were injection-molded in the same manner as in Example 1 and evaluated for flammability and arc resistance. The results obtained were as shown in Table 4.

As is apparent from Table 4, compositions with satisfactory flame resistance and improved arc resistance were also obtained when a sodium antimonate-antimony trioxide mixture was used (Examples 9 to 12). When a mixture of two flame retardants was used (Example 13), there was also obtained a composition with markedly improved arc resistance and flame resistance.

length and about 10 $\mu$ in diameter, 0.80 kg (18 parts by weight per 100 parts by weight of PTMT) of a flame retardant (A) of the formula,

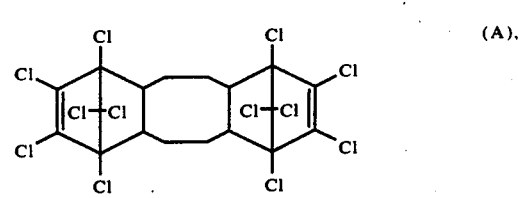

0.35 kg (8 parts by weight per 100 parts by weight of PTMT) of a brominated bisphenol-type epoxy resin (about 50% bromine content), 0.44 kg of sodium antimonate ($NaSbO_3 \cdot \frac{1}{4}H_2O$) (the weight ratio of the halogen compound to sodium antimonate was 2.6), and 0.98 kg (14% by weight based on the total composition excluding glass fiber) were mixed for about 5 minutes. The resulting mixture was formed into pellets by means of a 40-mm $\phi$ vented extruder at a cylinder temperature of 200° to 250° C. to obtain a flame-resistant composition falling in the scope of this invention.

The pellets were injection-molded in the same man-

Table 4

| Example No. | 9 | 10 | 11 | 12 | 13 |
|---|---|---|---|---|---|
| PTMT, kg | 5.5 | 5.1 | 5.5 | 5.5 | 5.5 |
| Flame retardant Type | $C_{1n}H_{12}Cl_{12}$[3] | $C_{1n}H_{12}Cl_{12}$[3] | Tetrabromobisphenol-A | Hexabromobenzene | Mixture[1] of $C_{1n}H_{12}Cl_{12}$ and brominated epoxy resin |
| Quantity, kg | 1.0 | 0.93 | 1.0 | 1.0 | { 0.5 (9) <br> 0.5 (9) |
| (parts by weight[1]) | (18) | (18) | (18) | (18) | |
| Sodium antimonate-antimony trioxide mixture | | | | | |
| Mixing ratio (by weight) | 56/44 | 53/47 | 56/44 | 56/44 | 100/0 |
| Quantity, kg | 0.50 | 0.97 | 0.50 | 0.50 | 0.50 |
| (weight ratio [2]) | (2.0) | (0.95) | (2.0) | (2.0) | (2.0) |
| Glass fiber, kg | 3.0 | 3.0 | 3.0 | 3.0 | 3.0 |
| Flammbility, L.O.I. (ASTM D 2863) | 27.5 | 31.0 | 29.0 | 32.5 | 28.5 |
| Arc resistance, sec. (ASTM D 495) | 46 | 38 | 50 | 60 | 71 |

Note:
[1]Parts by weight per 100 parts by weight of PTMT.
[2]Weight ratio of total halogen compound to total antimony compound.
[3]A cycloaliphatic compound.
[4]Mixture of 0.5 kg (9 parts by weight[1]) of $C_{1n}H_{12}Cl_{12}$ (a cycloaliphatic compound) and 0.5 kg (9 parts by weight[1]) of brominated epoxy resin (46% bromine content).

EXAMPLE 14

In a V-shaped blender, 4.43 kg of thoroughly dried PTMT having $(\eta)$ of 0.95, 3.0 kg of a commercially available chopped strand type glass fiber of 3 mm in ner as in Example 1 to prepare test specimens which were evaluated for flammability, arc resistance, and mechanical properties such as tensile strength. The results obtained were as shown in Table 5.

TAble 5

| | | Example 14 | Comparative Example 11 | Comparative Example 12 |
|---|---|---|---|---|
| PTMT | kg (parts by weight) | 4.43 (100) | 5.15 (100) | 4.43 (100)9 |
| Glass fiber | kg | 3.0 | 3.0 | 3.0 |

TAble 5-continued

|  |  | Example 14 | Comparative Example 11 | Comparative Example 12 |
|---|---|---|---|---|
| Flame retardant |  |  |  |  |
| Flame retardant (A) | kg | 0.80 | 0.93 | 0.80 |
|  | (parts by weight) | (18) | (18) | (18) |
| Brominated epoxy resin | kg | 0.35 | 0.41 | 0.35 |
|  | (parts by weight) | (8) | (8) | (8) |
| Sodium antimonate | kg | 0.44 | — | — |
|  | (weight ratio) | (2.6) |  |  |
| Antimony trioxide | kg | — | 0.51 | 0.44 |
|  | (weight ratio) |  | (2.6) | (2.6) |
| Talc | kg | 0.98 | — | 0.98 |
|  | (% by weight) | (14) | — | (14) |
| Arc resistance | second | 128 | 10 | 60 |
| Flammability (UL-94) (1/16 inch in thickness) |  |  |  |  |
| Average burning time | second | 1.22 | 0.85 | 1.04 |
| Rating | — | V-O | V-O | V-O |
| Tensile strength | kg/cm² | 1160 | 1200 | 1150 |
| Flexural strength | kg/cm² | 1790 | 1800 | 1760 |
| Izod impact strength, notched | kg.cm/cm | 6.0 | 6.2 | 6.1 |
| Deflection temperature | °C | 204 | 204 | 204 |
| Moldability | — | Good | Good | Good |

In Comparative Example 11 (Table 5), antimony trioxide, which is an ordinary flame-retardant auxiliary agent, was used in place of sodium antimonate, and no talc was added. Comparative Example 12 (Table 5) corresponds to the case where sodium antimonate in Example 14 was replaced by antimony trioxide.

As is apparent from Table 5, the present composition is markedly improved in arc resistance owing to the combined use of sodium antimonate and talc, as compared with a composition containing only antimony trioxide, which is an ordinary flame retardant auxiliary agent (Comparative Example 11). Compared with the case where antimony trioxide and talc were used (Comparative Example 12), the present composition shows an unexpectedly high arc resistance. Also, the present composition is self-extinguishing and retains good mechanical and thermal properties.

The flammability of the composition shown in Table 5 was tested on five test specimens, 1/16 inch in thickness, according to the method of Underwriter's Laboratories Bulletin 94 (UL-94). The burning time and rating are mean values for 10 testings. The moldability given in Table 5 is a qualitative rating derived from the extrusion workability and the flowability during injection molding.

In Table 5, the proportion of the flame retardant is given in parts by weight per 100 parts by weight of PTMT, the weight ratio of antimony compound is the weight ratio of the halogen compound to sodium antimonate or antimony trioxide, and the percent by weight of talc is based on the total composition excluding the glass fiber.

EXAMPLES 15 TO 20

In accordance with the formulations given in Table 6, thoroughly dried PTMT having ($\eta$) of 0.93, a commercially available chopped strand type glass fiber of 3 mm in length and about 10 $\mu$ in diameter, the flame retardant (A), a brominated disphenol-type epoxy resin having a 46% bromine content, sodium antimonate ($NaSbO_3 \cdot \frac{1}{4} H_2O$), and talc were mixed in a V-shaped blender for 5 minutes. The resulting mixture was formed into pellets by means of a 40-mm $\phi$ vented extruder to obtain a flame resistant resin composition falling in the scope of this invention.

The pellets were injection-molded in the same manner as in Example 14, and arc resistance, flammability, and moldability were evaluated on the molded specimen to obtain the results as shown in Table 6.

Table 6

| Example No. |  | 15 | 16 | 17 | 18 | 19 | 20 |
|---|---|---|---|---|---|---|---|
| PTMT | kg | 5.18 | 4.97 | 4.81 | 4.27 | 3.74 | 3.21 |
|  | (parts by wt.) | (100) | (100) | (100) | (100) | (100) | (100) |
| Glass fiber | kg | 3.0 | 3.0 | 3.0 | 3.0 | 3.0 | 3.0 |
| Flame retardant |  |  |  |  |  |  |  |
| Flame retardant (A) | kg | 0.83 | 0.80 | 0.77 | 0.68 | 0.60 | 0.51 |
|  | (parts by wt.) | (16) | (16) | (16) | (16) | (16) | (16) |
| Brominated epoxy resin | kg | 0.26 | 0.25 | 0.24 | 0.21 | 0.19 | 0.16 |
|  | (parts by wt.) | (5) | (5) | (5) | (5) | (5) | (5) |
| Sodium antimonate | kg | 0.52 | 0.49 | 0.48 | 0.44 | 0.37 | 0.32 |
|  | (wt. ratio) | (2.1) | (2.1) | (2.1) | (2.1) | (2.1) | (2.1) |
| Talc | kg | 0.21 | 0.49 | 0.70 | 1.4 | 2.1 | 2.8 |
|  | (% by wt.) | (3) | (7) | (10) | (20) | (30) | (40) |
| Arc resistance | second | 75 | 100 | 120 | 136 | 143 | 160 |
| Flammability (UL-94) (1/16 inch in thickness) |  |  |  |  |  |  |  |
| Average burning time | second | 0.78 | 0.75 | 0.97 | 1.25 | 1.08 | 1.20 |
| Rating | — | V-O | V-O | V-O | V-O | V-O | V-O |
| Moldability | — | Good | Good | Good | Good | Good | Moldable; reduced flow |

As is apparent from Table 6, owing to the synergistic effect of sodium antimonate and talc, the present composition is markedly improved in arc resistance even when the talc content is very small. There is no upper limit for the talc content of the present composition with respect to arc resistance and, hence, talc may be added in any amount so far as the moldability is not adversely affected.

EXAMPLES 21 TO 23

In a V-shaped blender, 4.92 kg of thoroughly dried PTMT having ($\eta$) of 0.95 and incorporated with 3.0 kg of a commercially available glass fiber; 0.89 kg of hexabromobenzene; 0.49 kg of a mixture of sodium antimonate and antimony trioxide in a ratio as shown in Table 7; and 0.7 kg of talc were mixed for about 5 minutes. The resulting mixture was extruded and formed into pellets in the same manner as in Example 15 to obtain a flame-resistant resin composition according to this invention. The pellets were injection-molded in the same manner as in Example 15 to prepare test specimens. The results of evaluation conducted on the test specimens were as shown in Table 7.

The compositions obtained in Comparative Examples 13 and 14 are of the same formulation as in Examples 21 to 23, except that the ratio of sodium antimonate to antimony trioxide is different.

Table 7

|  |  | Example 21 | Example 22 | Example 23 | Comparative Example 13 | Comparative Example 14 |
|---|---|---|---|---|---|---|
| PTMT | kg | 4.92 | 4.92 | 4.92 | 4.92 | 4.92 |
|  | (parts by wt.) | (100) | (100) | (100) | (100) | (100) |
| Glass fiber | kg | 3.0 | 3.0 | 3.0 | 3.0 | 3.0 |
| Flame retardant |  |  |  |  |  |  |
| Hexabromobenzene | kg | 0.89 | 0.89 | 0.89 | 0.89 | 0.89 |
|  | (parts by wt.) | (18) | (18) | (18) | (18) | (18) |
| Sodium antimonate-antimony trioxide |  |  |  |  |  |  |
| Mixing ratio | (wt. ratio) | 80/20 | 60/40 | 40/60 | 20/80 | 0/100 |
| Quantity | kg | 0.49 | 0.49 | 0.49 | 0.49 | 0.49 |
|  | (wt. ratio) | (1.8) | (1.8) | (1.8) | (1.8) | (1.8) |
| Talc | kg | 0.7 | 0.7 | 0.7 | 0.7 | 0.7 |
|  | (% by wt.) | (10) | (10) | (10) | (10) | (10) |
| Arc resistance | second | 135 | 113 | 100 | 45 | 41 |
| Flammability (UL-94) (1/16 inch in thickness) |  |  |  |  |  |  |
| Average burning time | second | 1.14 | 1.03 | 1.10 | 0.80 | 0.74 |
| Rating | — | V-O | V-O | V-O | V-O | V-O |
| Moldability | — | Good | Good | Good | Good | Good |

As is apparent from Table 7, the present composition shows also an excellent arc resistance when a sodium antimonate-antimony trioxide mixture is used in place of sodium antimonate alone. However, the effect of the combination of sodium antimonate and talc on arc resistance is not sufficient, if the sodium antimonate content of the said mixture is below 40%, as is clear from Comparative Examples 13 and 14.

EXAMPLES 24 TO 26

In a V-shaped blender, thoroughly dried PTMT having ($\eta$) of 1.05, a brominated bisphenol-type epoxy resin having a 46% bromine content, sodium antimonate, and talc in the proportions given in Table 8 were mixed for 5 minutes. The resulting mixture was treated and molded in the same manner as in Example 15. The thus obtained test specimens were evaluated for physical properties. The results obtained were as shown in Table 8. In Comparative Examples 15 and 16, antimony trioxide alone and a combination of antimony trioxide and talc were used, respectively.

From Table 8, it is seen that the present compositions are markedly improved in arc resistance and also excellent in flame resistance.

Table 8

|  |  | Example 24 | Example 25 | Example 26 | Comparative Example 15 | Comparative Example 16 |
|---|---|---|---|---|---|---|
| PTMT | kg | 7.74 | 6.86 | 4.03 | 8.06 | 7.74 |
|  | (parts by wt.) | (100) | (100) | (100) | (100) | (100) |
| Flame retardant |  |  |  |  |  |  |
| Brominated epoxy resin | kg | 1.39 | 1.23 | 0.73 | 1.45 | 1.39 |
|  | (parts by wt.) | (18) | (18) | (18) | (18) | (18) |
| Sodium antimonate | kg | 0.47 | 0.41 | 0.24 | — | — |
|  | (wt. ratio) | (3.0) | (3.0) | (3.0) | — | — |
| Antimony trioxide | kg | — | — | — | 0.49 | 0.47 |
|  | (wt. ratio) | — | — | — | (3.0) | (3.0) |
| Talc | kg | 0.6 | 1.5 | 5.0 | — | 0.6 |
|  | (% by wt.) | (6) | (15) | (50) | — | (6) |
| Arc resistance | second | 115 | 136 | 172 | 35 | 42 |
| Flammability (UL-94) (1/16 inch in thickness) |  |  |  |  |  |  |
| Averge burning time | second | 0.70 | 0.79 | 1.03 | 0.50 | 0.63 |
| Rating | — | V-0 | V-O | V-O | V-O | V-O |
| Moldability | — | Good | Good | Good | Good | Good |

EXAMPLES 27 TO 30

According to the formulations given in Table 9, thoroughly dried PTMT having ($\eta$) of 0.97, a commercially available glass fiber, sodium antimonate, talc, and a halogen compound were mixed. The mixture was formed into pellets by means of an extruder to obtain a flame-resistant resin composition falling in the scope of this invention. The pellets were injection-molded and evaluated in the same manner as in Example 15. The results obtained were as shown in Table 9.

From the results shown in Table 9, it is seen that the type of halogen compound to be used in the present composition is not critical for the purpose of improving the arc resistance.

Table 9

| | | Example 27 | Example 28 | Example 29 | Example 30 |
|---|---|---|---|---|---|
| PTMT | kg (parts by weight) | 4.92 (100) | 4.92 (100) | 4.80 (100) | 4.95 (100) |
| Glass fiber | kg | 3.0 | 3.0 | 3.0 | 3.0 |
| Flame retardant Type | | 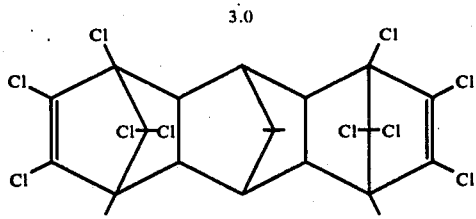 | Decabromodiphenyl ether | Tris-2,3-dibromopropyl phosphate | Tetrabromobisphenol A |
| Quantity | kg (parts by weight) | 0.98 (20) | 0.98 (20) | 0.72 (15) | 0.64 (13) |
| Sodium antimonate | kg (weight ratio) | 0.50 (2.0) | 0.50 (2.0) | 0.48 (1.5) | 0.41 (1.6) |
| Talc | kg (% by wt.) | 0.6 (8.6) | 0.6 (8.6) | 1.0 (14) | 1.0 (14) |
| Arc resistance | second | 102 | 128 | 122 | 131 |
| Flammability (UL-94) (1/16 inch in thickness) | | | | | |
| Average burning time | second | 5.05 | 2.60 | 1.13 | 2.30 |
| Rating | — | V - 1 | V - O | V - O | V - O |

What is claimed is:

1. A flame-resistant resin composition having an improved arc resistance, which comprises 100 parts by weight of polytetramethylene terephthalate, 3 to 50 parts by weight of a flame-retardant halogen compound, sodium antimonate or a sodium antimonate-antimony trioxide mixture containing 40% by weight or more of sodium antimonate, the weight ratio of the halogen compound to the total antimony compound being from 0.25 to 6, and 0 to 60% by weight, based on the weight of the total composition, of talc.

2. A composition according to claim 1, wherein the composition is incorporated with a reinforcing filler in a proportion of 40% by weight or less based on the weight of the total composition including the reinforcing filler.

3. A composition according to claim 1, wherein the composition contains 2 to 60% by weight of talc.

4. A composition according to claim 2, wherein talc is contained in a proportion of 2 to 60% by weight based on the weight of the composition excluding the reinforcing filler.

5. A composition according to claim 2, wherein the reinforcing filler is glass fiber.

6. A composition according to claim 4, wherein the reinforcing filler is glass fiber.

7. A composition according to claim 1, wherein the halogen compound is at least one member selected from the group consisting of hexabromobenzene, hexachlorobenzene, tetrabromobisphenol-A and derivatives thereof, tetrabromophthalic anhydride, decabromodiphenyl ether, trisdibromophenyl phosphate, tris-2,3-dibromopropyl phosphate, cycloaliphatic $C_{14}H_4Cl_{12}O$, $C_{17}H_8Cl_{12}$, and $C_{18}H_{12}Cl_{12}$; brominated polyester resins, brominated polycarbonate resins, and brominated epoxy resins.

8. The composition of claim 1, wherein the polytetramethylene terephthalate contains 40% by weight or less of a resin selected from the group consisting of polycarbonate, polystyrene, polymethyl methacrylate, polyethylene terephthalate, polyethylene, polypropylene, acrylonitrile-butadiene-styrene and nylon.

9. A composition according to claim 1, wherein the polytetramethylene terephthalate has an intrinsic viscosity of 0.4 to 3.0 dl/g, as measured in an equal weight mixture solvent of tetrachloroethane and phenol at 25° C.

* * * * *